Oct. 25, 1949.   M. W. BRAUNLICH   2,485,558
SIGHT ALIGNMENT ATTACHMENT
FOR SURVEYING INSTRUMENTS

Filed July 25, 1946   2 Sheets-Sheet 1

INVENTOR.
MILLS W. BRAUNLICH
BY
*M. Hayes*
ATTORNEY

Patented Oct. 25, 1949

2,485,558

UNITED STATES PATENT OFFICE 2,485,558

SIGHT ALIGNMENT ATTACHMENT FOR SURVEYING INSTRUMENTS

Mills W. Braunlich, Philadelphia, Pa.

Application July 25, 1946, Serial No. 686,099

1 Claim. (Cl. 88—69)

(Granted under the act of March 3, 1883, as amended April 30, 1928; 370 O. G. 757)

This invention relates to new and useful improvements in a surveying instrument by the installation of a periscopic sighting device in place of the usual plumb bob used for locating the surveying instrument with reference to a given object such as, for example, a reference point. The periscopic sighting device is mounted as an attachment to the spindle of the instrument so as to lie below the instrument but rigidly attached thereto in true axial alignment therewith, or mounted above the instrument mounting plate by being incorporated in said spindle. In either case the periscopic sighting device of this invention incorporates an observation port, a diagonal reflecting mirror, eyepiece lenses with their focusing means, a cross-hair ring with suitable adjustment screws and cross hairs, and objective focusing slide with an objective lens.

Surveying instruments are made in many types and models for various purposes. Many have a plumb bob suspended from the center of the spindle so that the instrument, when mounted and properly leveled, is centered over any location mark such as, for example, a reference point.

In many instances, when surveyors work out of doors in windy weather, it is difficult to locate the surveying instrument accurately over a reference point because of the swinging action of the plumb bob. This invention replaces the pendulum-like plumb bob with a rigid, periscopic sighting device so that the operator can locate the surveying instrument, with respect to a reference point below the instrument, by observing the location of said reference point through the eyepiece of the periscope of the sighting device and with reference to cross hairs in the periscope.

It is often necessary to use a surveying instrument at a considerable distance above a reference point, as for instance, when the instrument is set up on a high building and the reference point is located on the ground below. With this periscopic sighting device the reference point can be more easily located than with a plumb bob, which would be unhandy, inaccurate and require more time to locate because of the pendulum action, due to wind.

A principal object of this invention is the use of a periscopic sighting device to locate and centralize a surveying instrument with respect to a given object below the instrument such as, for example, a reference point.

Another object is to make a periscopic sighting device so that it can be attached to the vertical spindle of an existing surveying instrument in such manner that the entire device extends below its mounting plate.

Still another object is to mount a periscope as a centrally located sighting device and as an integral part of any new surveying instrument so as to extend above its mounting plate.

These and other objects of the invention, and the various features and details of the construction, operation and use thereof are hereinafter more fully set forth and described with reference to the accompanying drawings in which like numbers refer to like parts and in which.

Figure 1:
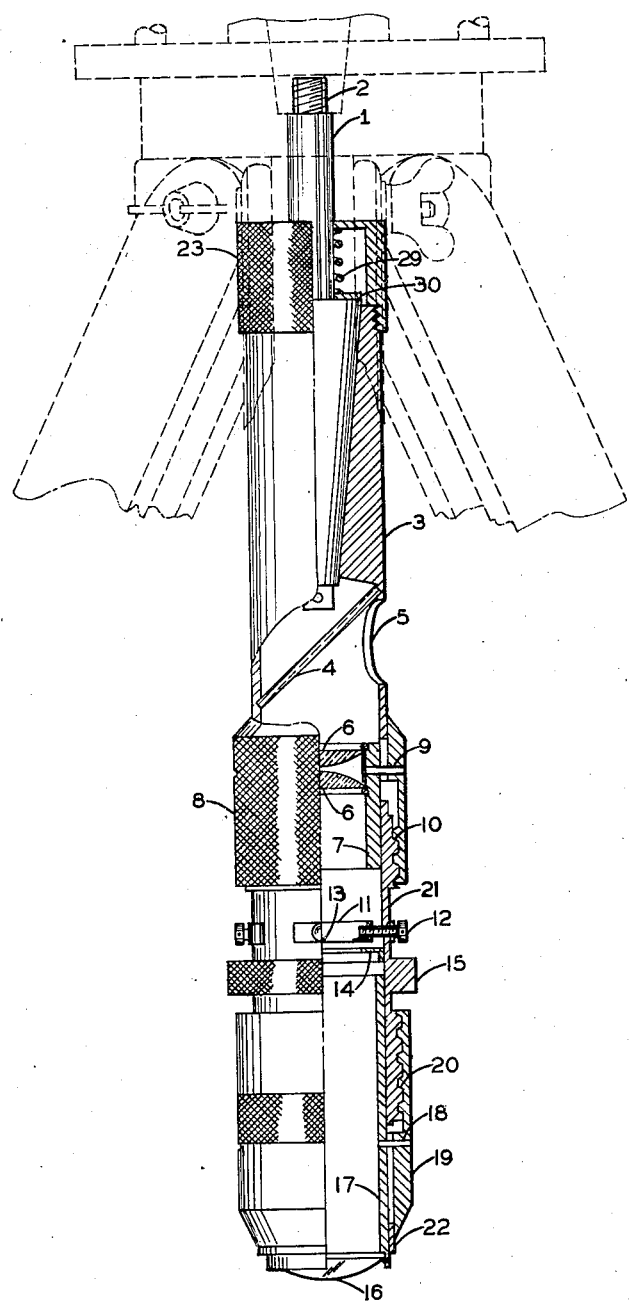
Fig. 1 is a side elevational view partly cut away, showing the periscopic sighting device attached to and mounted below the mounting plate of a surveying instrument.

In Fig. 1 numeral 1 designates the attachment spindle engaging a surveying instrument by screw thread 2. Periscope sighting device barrel 3 is mounted on and axially aligned with spindle 1 and carries diagonal reflecting mirror 4, which is observed through observation port 5. Eyepiece lenses 6 are located in eyepiece slide 7, operated by eyepiece focusing nut 8 through eyepiece slide pin 9, connecting eyepiece slide 7 with eyepiece focusing nut 8, which latter engages eyepiece focusing screw thread 10 on periscope barrel 21. Cap 23 encloses supporting spring 29 and washer 30.

Cross-hair ring 11 is supported and adjusted by cross-hair adjustment screws 12 in periscope barrel 21, cross hairs 13 being mounted in ring 11. A light stop 14 is located below the cross-hair ring. The ring 15 is for holding or rotation of the periscope barrel 21.

Objective lens 16 is supported and adjusted by objective slide 17 through pin 18 connecting with objective focusing nut 19, that operates on objective focusing screw thread 20 and is attached to element 22.

The object in relation to which a surveying instrument is to be located is sighted through observation port 5 where it is seen in diagonal mirror 4 as magnified by lens 16 and eyepieces 6 and aligned with the surveying instrument by cross hairs 13.

Any desired magnification of the observed object can be obtained by proper selection of lenses and their location in the periscope barrel.

Figure 2:
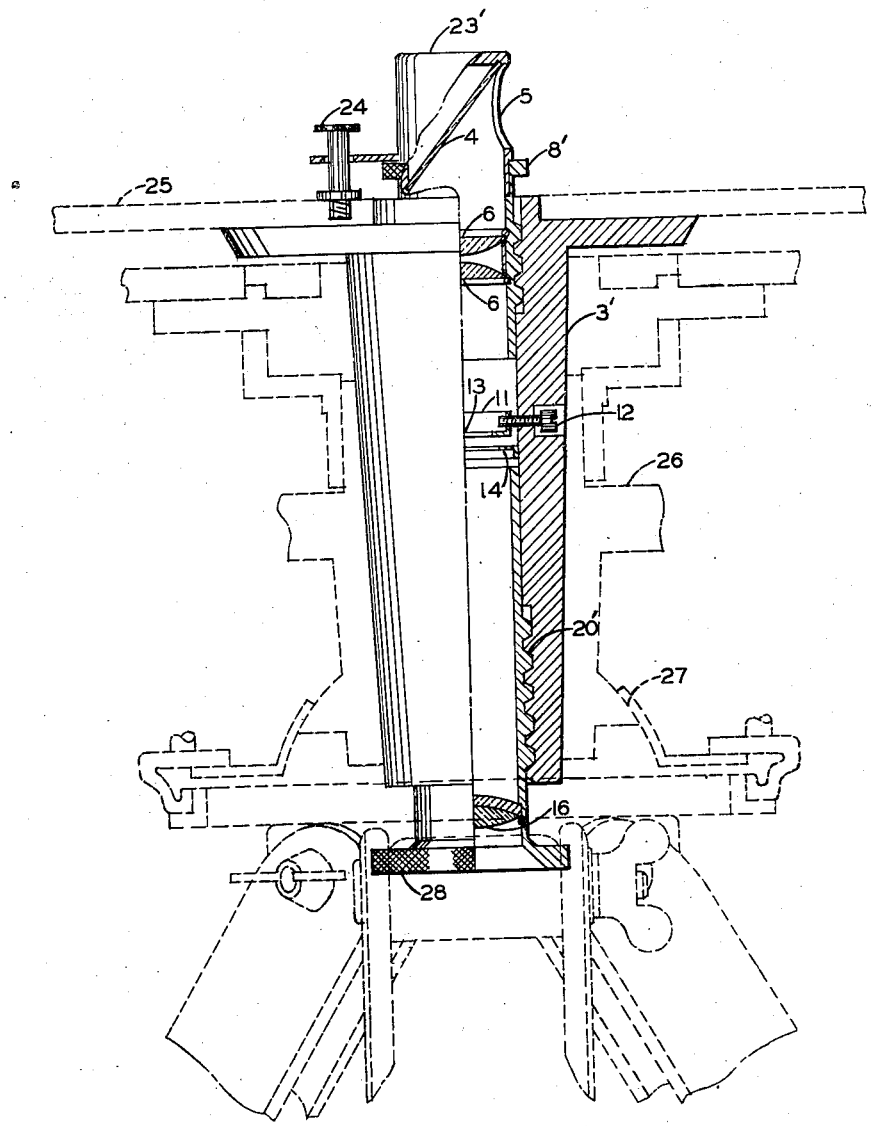
Fig. 2 is a side elevational view, partly cut away, showing the periscope sighting device mounted inside vertical spindle of surveying instrument.

Fig. 2 shows a sighting device incorporated in a new instrument, in which numeral 5' is the observation port in cap 23' that supports diagonal reflecting mirror 4', cap 23' and mirror 4' being held against rotation by stop screw 24 in plate 25. Eyepiece focusing knurled nut 8' is carried by and threaded into periscope barrel 3', that is supported in a taper socket in the mounting flange 26 positioned by a spherical seat 27 and by means of which, through leveling screws (not shown), the surveying instrument is leveled. Objective-focusing screw 28 carries and positions objective lens 16' by engaging screw thread 20' in periscope barrel 3'.

Cross hairs 13' are carried in cross-hair ring 11' and are adjusted by cross-hair ring adjustable screws 12' threaded through periscope barrel 3'. Light stop 14' is mounted in periscope barrel 3'.

Any desired magnification of the observed object is obtained by the proper selection of lenses and their location in the periscope barrel. The parts shown by dotted lines in Fig. 2 are those having the function of supporting the surveying instrument itself and are not a part of this invention but show that the observation port of the periscope, in this adaptation to a surveying instrument, is located above said instrument's mounting and leveling bracket and therefore is unrestricted as to vision by the tripod supporting legs as it is in the device shown in Fig. 1.

While a particular embodiment of this invention has been illustrated and described herein, it is not intended that this invention be limited to such disclosure, and changes and modifications can be made and incorporated within the scope of the claim.

The invention described herein may be manufactured and used by or for the Government of the United States of America for governmental purposes without the payment of any royalties thereon or therefor.

I claim:

In a surveying-type instrument, a base; a spindle mounted on said base for providing an axis of rotation relative to said base; said spindle having an axially tapered portion; an optical instrument on said spindle including a barrel, cross hairs in the barrel where an image is formed, said barrel having an opening in its wall, and a mirror located in said barrel at the opening so that an observer outside of the barrel can view through the opening the image and cross hairs; said instrument having its ocular line of sight substantially perpendicular to its objective line of sight; said barrel having an internal axially tapered portion adapted to mate with the tapered portion of the spindle so that the axis of rotation of the spindle and the objective line of sight of the instrument are in alignment; and spring means for urging said tapered portions into mating engagement; said spring being yieldable so that said tapered portions can be separated and said barrel rotated relative to said spindle.

MILLS W. BRAUNLICH.

REFERENCES CITED

The following references are of record in the file of this patent:

UNITED STATES PATENTS

| Number | Name | Date |
|---|---|---|
| 780,397 | Whitney | Jan. 17, 1905 |
| 835,711 | Olsen et al. | Nov. 13, 1906 |
| 928,477 | Sloggett | July 20, 1909 |
| 1,730,290 | Petschenig et al. | Oct. 1, 1929 |
| 1,827,135 | Blake | Oct. 13, 1931 |
| 2,225,037 | Dake | Dec. 17, 1940 |